United States Patent
Ramachandran et al.

(10) Patent No.: US 11,842,206 B2
(45) Date of Patent: Dec. 12, 2023

(54) GENERATING CONTENT ENDORSEMENTS USING MACHINE LEARNING NOMINATOR(S)

(71) Applicant: GOOGLE LLC, Mountain View, CA (US)

(72) Inventors: Deepak Ramachandran, Sunnyvale, CA (US); Sarvjeet Singh, Palo Alto, CA (US); Tania Bedrax-Weiss, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/608,700

(22) PCT Filed: May 31, 2019

(86) PCT No.: PCT/US2019/034926
§ 371 (c)(1),
(2) Date: Nov. 3, 2021

(87) PCT Pub. No.: WO2020/226666
PCT Pub. Date: Nov. 12, 2020

(65) Prior Publication Data
US 2022/0229676 A1    Jul. 21, 2022

Related U.S. Application Data

(60) Provisional application No. 62/843,886, filed on May 6, 2019.

(51) Int. Cl.
*G06F 9/451* (2018.01)
*H04L 51/02* (2022.01)

(52) U.S. Cl.
CPC .............. *G06F 9/453* (2018.02); *H04L 51/02* (2013.01)

(58) Field of Classification Search
CPC .................................................... G06F 16/9535
See application file for complete search history.

(56) References Cited

U.S. PATENT DOCUMENTS 7,113,917 B2    9/2006  Jacobi et al.
10,210,548 B1 *  2/2019  Wai .................... G06Q 30/0207
(Continued)

FOREIGN PATENT DOCUMENTS

CN    101556622 A    10/2009
CN    102316046 A    1/2012
(Continued)

OTHER PUBLICATIONS

Chinese National Intellectual Property Administration; Office Action issued in Application No. 201980096013.4; 16 pages; dated Sep. 21, 2022.
(Continued)

*Primary Examiner* — Di Xiao
(74) *Attorney, Agent, or Firm* — Gray Ice Higdon

(57) ABSTRACT

Techniques are disclosed that enable the generation of candidate endorsements for recommended items of content using an ensemble of nominators. Various implementations include each nominator in the ensemble providing a candidate endorsement for each recommended item of content. Additionally or alternatively, an endorsement is selected to present to the user based on a score determined for each candidate endorsement.

18 Claims, 7 Drawing Sheets

(56) References Cited

U.S. PATENT DOCUMENTS

| | | | |
|---|---|---|---|
| 10,657,934 B1* | 5/2020 | Kolen | G10H 1/0025 |
| 2009/0006398 A1 | 1/2009 | Lam et al. | |
| 2009/0259621 A1 | 10/2009 | Svendsen et al. | |
| 2010/0191582 A1* | 7/2010 | Dicker | G06Q 30/0631 |
| | | | 705/26.1 |
| 2011/0320462 A1 | 12/2011 | Bao et al. | |
| 2013/0204740 A1 | 8/2013 | Barbieri et al. | |
| 2014/0136528 A1* | 5/2014 | Anima | G06F 16/951 |
| | | | 707/723 |
| 2015/0286662 A1 | 10/2015 | Marra | |
| 2017/0161618 A1* | 6/2017 | Swaminathan | G06F 16/23 |
| 2017/0161794 A1* | 6/2017 | Zhu | G06Q 30/0276 |
| 2018/0239770 A1* | 8/2018 | Ghotbi | H04L 51/046 |
| 2019/0158433 A1* | 5/2019 | Yun | G10L 15/02 |
| 2020/0175078 A1* | 6/2020 | Gueta | G06F 16/90332 |
| 2020/0402131 A1* | 12/2020 | Tanaka | G06Q 30/0282 |

FOREIGN PATENT DOCUMENTS

| | | | |
|---|---|---|---|
| CN | 103229203 A | 7/2013 | |
| CN | 104281961 A | 1/2015 | |
| CN | 104281962 A | 1/2015 | |
| CN | 104903929 | 9/2015 | |
| CN | 106469398 A | 3/2017 | |

OTHER PUBLICATIONS

European Patent Office; International Search Report and Written Opinion of Ser. No. PCT/US2019/034926; 14 pages; dated Nov. 18, 2019.

Tintarev, N. et al. "A Survey of Explanations in Recommender Systems," IEEE; Proceedings of International Conference on Data Engineering Workshop, 2007; 10 pages.

Tintarev N. et al. "Designing and Evaluating Explanations for Recommender Systems," Chapter 15, Recommender Systems Handbook; Springer Science + Business Media, LLC; pp. 479-510; 2011.

Daher, J. et al. "A Review on Explanations in Recommender Systems;" Technical Report; LORIA—Université de Lorraine; HAL Id: hal-01836639; https://hal.archives-ouvertes.fr/hal-01836639; 26 pages; 2017.

Gedikli, F. et al. "How should I explain? A comparison of different explanation types for recommender systems;" Science Direct, International Journal of Human-Computer Studies, vol. 72, Issue 4, pp. 367-382; Apr. 2004.

Kulesza, A. et al. "Determinantal Point Processes for Machine Learing;" arXiv.org; arXiv:1207.6083v4; 120 pages; Jan. 10, 2013.

Chinese National Intellectual Property Administration; Notice of Allowance issued in Application No. 201980096013.4; 4 pages; dated Mar. 26, 2023.

* cited by examiner

GENERATING CONTENT ENDORSEMENTS USING MACHINE LEARNING NOMINATOR(S)

BACKGROUND

Humans may engage in human-to-computer dialog with interactive software applications referred to herein as "automated assistants" (also referred to as "digital agents", "chatbots", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual interface output.

An automated assistant and/or other application(s) can provide a user with recommended content including video, audio, images, web pages, news articles, videos, recipes, blog posts, electronic books, memes, social media posts, and/or additional types of content. In some cases, content can be recommended in response to a specific request for the content by the user. Additionally or alternatively, content can be proactively rendered to the user without a specific request for content by the user.

SUMMARY

Implementations described herein are directed towards generating candidate endorsements for items of content using an ensemble of nominators; selecting an endorsement from the candidate endorsements based on a determined score for the candidate endorsements; and rendering the items of content with the selected endorsements. An endorsement is a communication (e.g., natural language communication(s) and/or additional types of communications) indicating why a user should interact with an item of content. For example, a recommendation for a smart doorbell can have a corresponding endorsement of "users of your smart thermostat frequently use this device". An endorsement can include a single phrase, a dialog with multiple turns in the conversation, and/or additional communication(s) with the user. As used herein, a "dialog session" may include a logically self-contained exchange of one or more messages between a user and a computing system such as an automated assistant client (and in some cases, other human participants). A computing system may differentiate between multiple dialog sessions with a user based on various signals, such as passage of time, change of user context (e.g., location, before/during/after a scheduled meeting, etc.) between sessions, detection of one or more intervening interactions between the user and a client device other than the dialog (e.g., the user switches applications for a while, the user walks away from then later returns to a client device), locking/sleeping of the client device between sessions, change of client devices used to interface with one or more instances of the automated assistant, etc. User interaction with content can include, selecting, selecting and viewing for at least a threshold duration, and/or other interaction(s) with the content.

In a variety of implementations, an ensemble of nominators can be used in determining a group of candidate endorsements for a recommended item of content. As used herein, a nominator can describe a variety of types of logical structures implemented in software including a machine learning model used in processing an item of content to determine a candidate endorsement. Nominators can include a variety of types of nominators, where each type is used in generating a distinct type of endorsement. In many implementations, nominator types can include recommender nominators, summarization nominators, fact nominators, baseline nominators, and/or additional types of nominators.

In general, endorsements may provide some additional information about the item of content with which they are associated. For example, recommender nominators are used in generating an endorsement that provides an explanation of why a recommendation engine selected the item of content. In many implementations, recommender nominators can make use of integrated path gradients, concept activation vectors, rationalization tags, and/or additional techniques that provide an explanation for a given item of content. For example, a recommender nominator can generate an endorsement of "this automated assistant client device is recommended because you own a smart thermostat".

Summarization nominators can be used in generating an endorsement by mining documents (e.g., reviews of the content, forum posts on the content, descriptions of the content, and/or additional documents relating to the content). For example, a summarization nominator can generate an endorsement of "Many reviews said this was a great restaurant for a date".

Fact nominators are used in generating an endorsement based on facts related to the item of content. In a variety of implementations, the facts are unknown to the user. For example, a fact nominator can generate an endorsement of "This movie has a lot of fun car chases".

Baseline nominators are used in generating an endorsement based on heuristic(s) which, for example, can be used to perform computation(s) on meta-data corresponding with the recommended item. For example, endorsements generated using a baseline nominator can include: "80,000 people liked this"; "Ends in 3 days"; "Hypothetical Band will be attending"; "You've visited this place before"; "You have rated this place 5 stars".

In a variety of implementations, an ensemble of nominators can include a variety of types of nominators (e.g., the ensemble includes a recommender nominator, a facts nominator, and a baseline nominator). Furthermore, the ensemble of nominators can contain multiple of the same type of nominator (e.g., a first facts nominator, a second facts nominator, and a third facts nominator). Additional or alternative combinations of nominators can be included in an ensemble of nominators in accordance with a variety of implementations.

In some implementations, each nominator is used in generating a single endorsement for each item of content. In other implementations, each nominator is used in generating multiple endorsements for each item of content (e.g., a nominator generates two endorsements, three endorsements, and/or additional numbers of endorsements).

An endorsement can be selected for presentation to a user based on scores determined for each of the candidate endorsements. The score can be indicative of the likelihood the user will interact with an item of content based on a specific candidate endorsement. A scoring system can be utilized that generates a uniform type of score across the various types of nominators. Different types of nominators can utilize a variety of data sources in generating a candidate endorsement. For instance, a summarization monitor can utilize content reviews, a baseline nominator can utilize content item metadata, etc.

In many implementations, a score for a candidate endorsement can be determined utilizing a variety of sub-scores, such as a nominator sub-score, a strategy sub-score, an entity personalization sub-score, and/or additional sub score(s). A nominator sub-score can indicate how relevant the nominator views that endorsement to be, without using any user context (and can often be determined using the nominator itself). This score can be calibrated, for example, by using offline processing that monitors the distribution of scores of each nominator across a sample of items. In many implementations, a nominator sub-score is dependent on the endorsement being scored as well as the item being recommended to the user.

Additionally or alternatively, a strategy sub-score can predict how effective a particular endorsement strategy (i.e., a particular nominator) will be for a specific user. For example, one or more attributes of the user can be included in a user profile, such as an attribute indicating a user is cost-conscious. For cost-conscious users it may be advantageous to boost a price-based endorsement strategy. In other words, the strategy sub-score can be dependent on the nominator generating the endorsement as well as a user profile of the user to which content will be recommended.

Furthermore, an entity personalization sub-score can determine the extent to which the candidate endorsement is relevant to a particular user. In many implementations, the entity personalization sub-score can be dependent on the candidate endorsement being scored as well as the user profile of the user to which the content is being recommended. The entity personalization sub-score can capture how well topical interests of the user (e.g., as indicated by the user profile) are captured by the information contained in the endorsement.

Once a score is determined for each candidate endorsement, an endorsement can be selected to be rendered and/or spoken to the user with the recommended item of content. In many implementations, the candidate endorsement with the highest score is selected. Additionally or alternatively, in implementations which include rendering one or more endorsements with each item of content, each candidate endorsement with a score above a threshold value can be selected for rendering to the user with the item of content.

In many implementations, it can be determined whether a user interacts with a specific item of rendered content. Based on this determination, one or more nominators can be updated. For example, the nominator used in generating a selected endorsement can be updated when a user interacts with the item of content and/or when the user does not interact with the item of content. Additional or alternative nominators can be updated based on the user interaction with the content. For example, all other nominators (excluding the nominator used in generating a selected endorsement) can be updated with a user interacts with the item of content.

Recommended content can include an initial order for rendering the items of content for the user. In many implementations, the score of the selected endorsements corresponding with the items of content can be used to change the order of the items of content prior to rendering the items of content.

Accordingly, various implementations set forth techniques for enabling navigation to user desired content—and to do so in a manner that enables navigation to the content to be more efficient through the use of endorsements generated by an ensemble of nominators. For example, candidate endorsements can be identified based on an ensemble of nominators personalized for a user. These nominators can be personalized based on whether a user interacted with an item of content based on the endorsement. By providing a user with an endorsement of content highly relevant to the user, the endorsements can be used to more efficiently identify content desired by the user.

System resources (e.g., processor cycles, memory, battery power, and/or additional resources of a computing system) can be conserved by providing recommended items of content with selected endorsements. For example, a user can more quickly make a determination whether he or she will interact with an item of content, and in some cases can make a determination whether to interact with an item of content without having to select the item of content. In other words, endorsements can reduce the likelihood a user will select an item of content and quickly make a determination they do not wish to interact with the entire item of content, thus causing the user to select an additional item of content. Reduced interactions with multiple items of content can shorten the duration of the overall user-system interaction, conserving various resources through enabling the interaction to cease earlier. Additionally or alternatively, the time saved from the shortened duration of the overall user-system interaction can lead to higher user satisfaction with the product.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
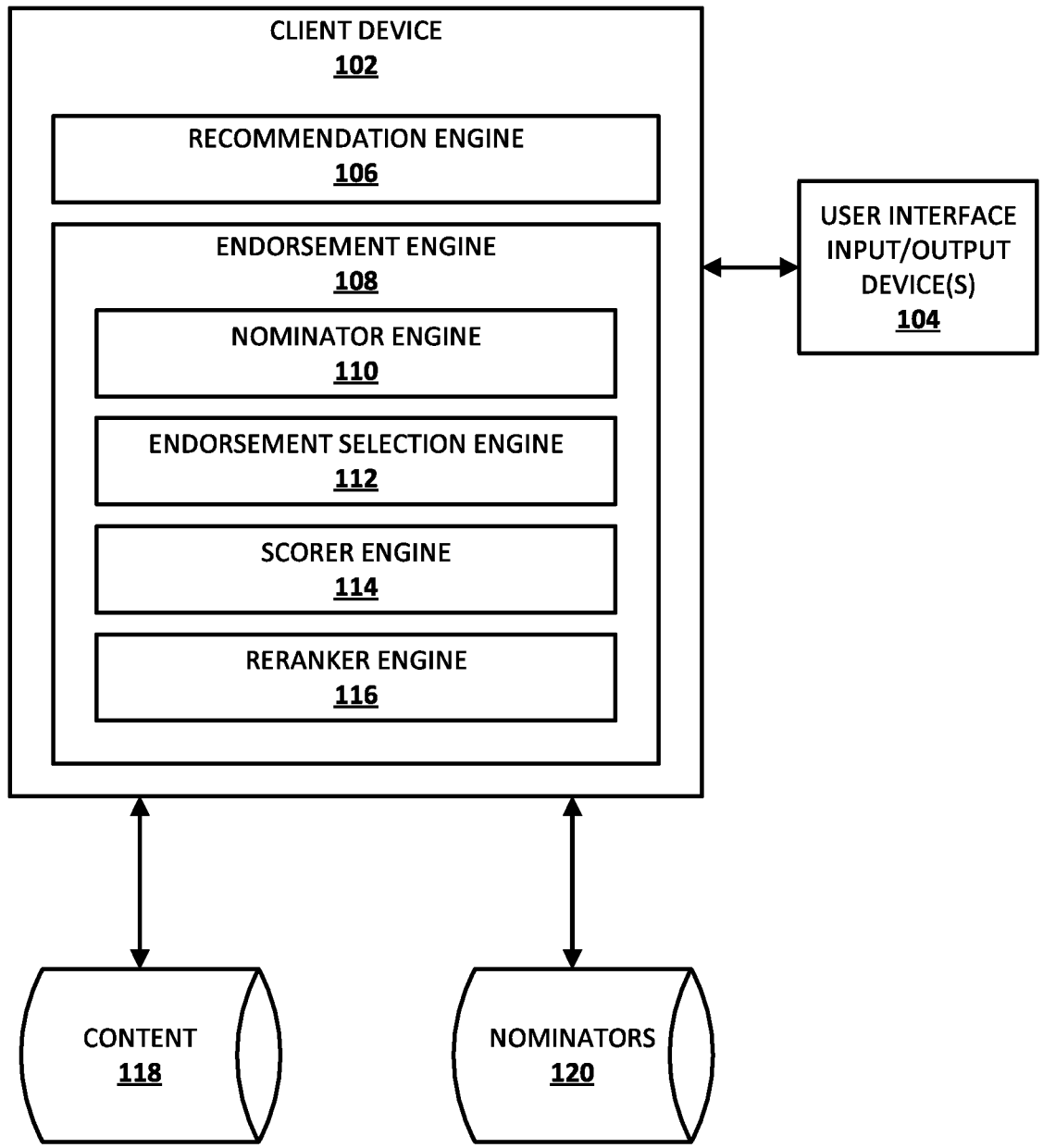
FIG. 1 illustrates an example environment where various implementations disclosed herein can be implemented.

FIG. 1 illustrates an example environment in which implementations disclosed herein may be implemented. The example environment of FIG. 1 includes client device 102 which may be associated with user interface input/output device(s) 104, content 118, and/or nominators 120. Client device 102 can include recommendation engine 106 for generating recommended items of content to be presented to a user of the client device, and can include endorsement engine 108 for determining an endorsement to present with each recommended item of content. In many implementations, endorsement engine 108 can include a variety of additional and/or alternative engines including nominator engine 110, endorsement selection engine 112, scorer engine 114, reranker engine 116, and/or additional engine(s) (not depicted). The user interface input/output device(s) 104 may include, for example, a physical keyboard, a touch screen (e.g., implementing a virtual keyboard or other textual input mechanism), a microphone, a camera, a display screen, speaker(s), and/or additional device(s) to capture user input and/or render output for a user. The user interface input/output devices 104 may be incorporated with one or more client devices 102 of a user. For example, a mobile phone of the user may include the user interface input/output device(s) 104; a standalone personal assistant hardware device may include the user interface input/output device(s) 104; or a first computing device may include user interface input device(s) 104 and a separate computing device may include user interface output device(s) 104; etc.

In some implementations, client device 102 may include an automated assistant (not depicted), and all or aspects of the automated assistant may be implemented on computing device(s) that are separate and remote from the computing device that contains user interface input/output device(s) 104 (e.g., all or aspects may be implemented "in the cloud"). In some of those implementations, those aspects of the automated assistant may communicate with client device 102 via one or more networks (not depicted) such as a local area network (LAN) and/or a wide area network (WAN) (e.g., the internet).

Some non-limiting examples of client device 102 that may include the user interface input/output device(s) 104 include one or more of: a desktop computing device, a laptop computing device, a standalone hardware device at least in part dedicated to an automated assistant, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative client devices may be provided.

Client device 102 may include one or more memories for storage of data and software applications, one or more processors for accessing data and executing applications, and other components that facilitate communication over a network. The operations performed by client device 102 may be distributed across multiple computing devices. For example, computing programs running on one or more computers in one or more locations can be coupled to each other through a network.

As illustrated in FIG. 1, client device 102 can determine recommended items of content and endorsements for those items of content. Output device(s) of user interface input/output device (s) 104 can be utilized in rendering the recommended items of content and the corresponding endorsements for the user of the client device. As used herein, rendering content includes rendering an entire item of content, rendering a hyperlink to an item of content, rendering a thumbnail image identifying the item of content, rendering a summary of an item of content and/or additional representation(s) of an item of content. Recommended content can include a variety of digital content including: video, audio, image, web pages, news articles, videos, recipes, blog posts, electronic books, memes, social media posts, restaurant recommendations, and/or additional types of content a user can interact with via client device 102.

Recommendation engine 106 can generate one or more recommended items of content for a user, such as recommend one or more items of content 118. For example, recommendation engine can generate content 1, content 2, and content 3 as recommended content for the user. In many implementations, the recommended items of content have an inherent order determined by recommendation engine 106. In some implementations, recommendation engine 106 can generate recommended items of content in response to a request from a user (e.g., a natural language spoken request from a user for content recommendations). In additional and/or alternative implementations, recommendation engine 106 can preemptively generate recommended items of content for a user. In a variety of implementations, recommendation engine 106 can be remote from client device 102, such as recommendation engine 106 determining recommended items of content via cloud computing and transmitting the recommended items of content to the client device 102 via the Internet. Additionally or alternatively, recommendation engine 106 can be integrated as part of endorsement engine 108. In other words, endorsement engine 108 can generate recommended items of content as well as determine endorsements to present with the recommended items of content.

Although endorsement engine 108 is shown as integral with client device 102, this is not meant to be limiting. In various implementations, one or more components of endorsement engine 108 may be implemented in whole or in part on remote computing system(s) forming a "cloud" infrastructure. Endorsement engine 108 can include nominator engine 110, endorsement selection engine 112, scorer engine 114, reranker engine 116, and/or additional engines (not depicted). Nominator engine 110, can generate candidate endorsements for recommended items of content using an ensemble of nominators 120. In some implementations, nominator engine 110 can select the ensemble of nominators from nominators 120 to be utilized in generating candidate endorsements for recommended items of content. Different ensemble(s) of nominators can be associated with different types of content. For example, the ensemble of: nominator A, nominator B, and nominator C can be utilized in generating endorsements for recipe recommendations. In contrast, the ensemble of: nominator D, nominator E, nominator F, and nominator G can be utilized in generating endorsements for recommended news articles. Although this example illustrates non-overlapping ensembles of nominators, nominator(s) included in a first ensemble can overlap with nominator(s) included in a second ensemble (e.g., the ensemble of nominators for a first type of content includes nominators A, B, C, and D, and the ensemble of nominators for a second type of content includes nominators B, C, D, E and F). Additional and/or alternative combinations of nominators can be included in ensembles of nominators in accordance with implementations described herein.

Nominator engine 110 can utilize an ensemble of nominators to generate candidate endorsements for recommended items of content. Each nominator in the ensemble can be utilized to generate candidate endorsement(s) for each recommended item of content. In many implementations, each nominator in the ensemble can be utilized to generate a single candidate endorsement. Additionally or alternatively, in some implementations, each nominator in the ensemble can be utilized to generate two, three, four, and/or other number(s) of candidate endorsements. Furthermore, in many implementations, each nominator in the ensemble can generate a distinct candidate recommendation. In some other implementations, two or more nominators can generate the same or substantially similar candidate endorsements. For example, nominator A can generate the candidate endorsement of "reviews say this a romantic restaurant for a date" and nominator B can generate a substantially similar endorsement of "reviewers say this is a romantic restaurant for a date".

Additionally or alternatively, nominator engine 110 can be used to update one or more nominators in response to whether the user interacted with the recommended item of content. For example, one or more parameters (e.g., one or more network weights) of one or more nominators can be updated through backpropagation. In many implementations, nominators can be personalized for a user by associating the nominators with a known profile for the user. In other words, the nominators of the user profile can be updated based on when the user associated with the profile interacts with (or does not interact with) a recommended item of content. A known user profile can be associated with the user based on one or more determined characteristics such as voice signatures (e.g., text independent voice identification, text dependent voice identification, and/or other voice identification), facial recognition, image feeds, motion characteristics, and/or other data.

Endorsement selection engine 112 can select an endorsement to present with each recommended item of content. The endorsement to present with an item of content can be selected based on the scores of each candidate endorsement determined using scorer engine 114 (as described below). In many implementations, endorsement selection engine 112 can select the candidate endorsement with the highest score to present with the recommended item of content. Additionally or alternatively, endorsement selection engine 112 can select more than one candidate endorsement to present with an item of content (e.g., item of content A is rendered with endorsement 1 and endorsement 2). In some such implementations, endorsement selection engine 112 can select the candidate endorsements with the highest scores, select all candidate endorsements with a score satisfying a criterion (such as exceeding a threshold value), and/or select candidate endorsements based on other criteria.

Scorer engine 114 can determine a score for each candidate endorsement in accordance with a variety of implementations. A score can be in indication of the likelihood a user will interact with an item of content based on the endorsement. In many implementations, a score can be determined utilizing a variety of sub-scores including a nominator sub-score, a strategy sub-score, an entity personalization sub-score, and/or additional sub-score(s). Utilizing a variety of types of score information can provide a uniform scoring across nominators that determine candidate recommendations by accessing a variety of different data sources.

A nominator sub-score can depend on the candidate endorsement being scored as well as the item of content recommended to the user. In other words, a nominator sub-score can indicate how relevant the nominator which generated the candidate endorsement views the candidate endorsement. In many implementations, a nominator sub-score can be determined using the nominator itself as part of the process of generating the candidate endorsement. Additionally or alternatively, scorer engine 114 can generate the nominator sub-score.

Scorer engine 114 can determine the strategy sub-score corresponding to a candidate endorsement. In many implementations, the strategy sub-score can depend on the nominator generating the candidate endorsement as well as the user to which the content is recommended. In other words, the strategy sub-score provides an indication of how effective a particular endorsement strategy (i.e., a particular nominator) will be in generating an endorsement for a particular user.

Furthermore, scorer engine 114 can determine an entity personalization sub-score corresponding to a candidate endorsement. In many implementations, the entity personalization sub-score can be dependent on the candidate endorsement being scored as well as a user profile associated with the user for which the item of content is recommended. In other words, the entity personalization sub-score can provide an indication of how relevant the candidate endorsement is to a particular user.

As described above, recommended items of content can include an order of how to render the items of content for the user from the recommendation engine. For example, the recommendation can determine item of content A to render first, item of content B to render second, and item of content C to render third. Reranker engine 116 can utilize the scores of the endorsements selected to provide with the items of content to change the order the items of content are rendered for the user. In other words, reranker engine can be utilized to change the order of items of content are displayed to the user by rendering items of content the user is more likely to interact with (based on the endorsement score) first.

Endorsement engine 108 can additionally or alternatively incorporate signals for other engines of the client device when scoring and/or raking candidate endorsements including: a sentiment analyzer, a syntactic checker, a consistency checker, and/or additional signals to increase the accuracy of selected endorsements and/or increase a user's ability to understand endorsements.

Figure 2:
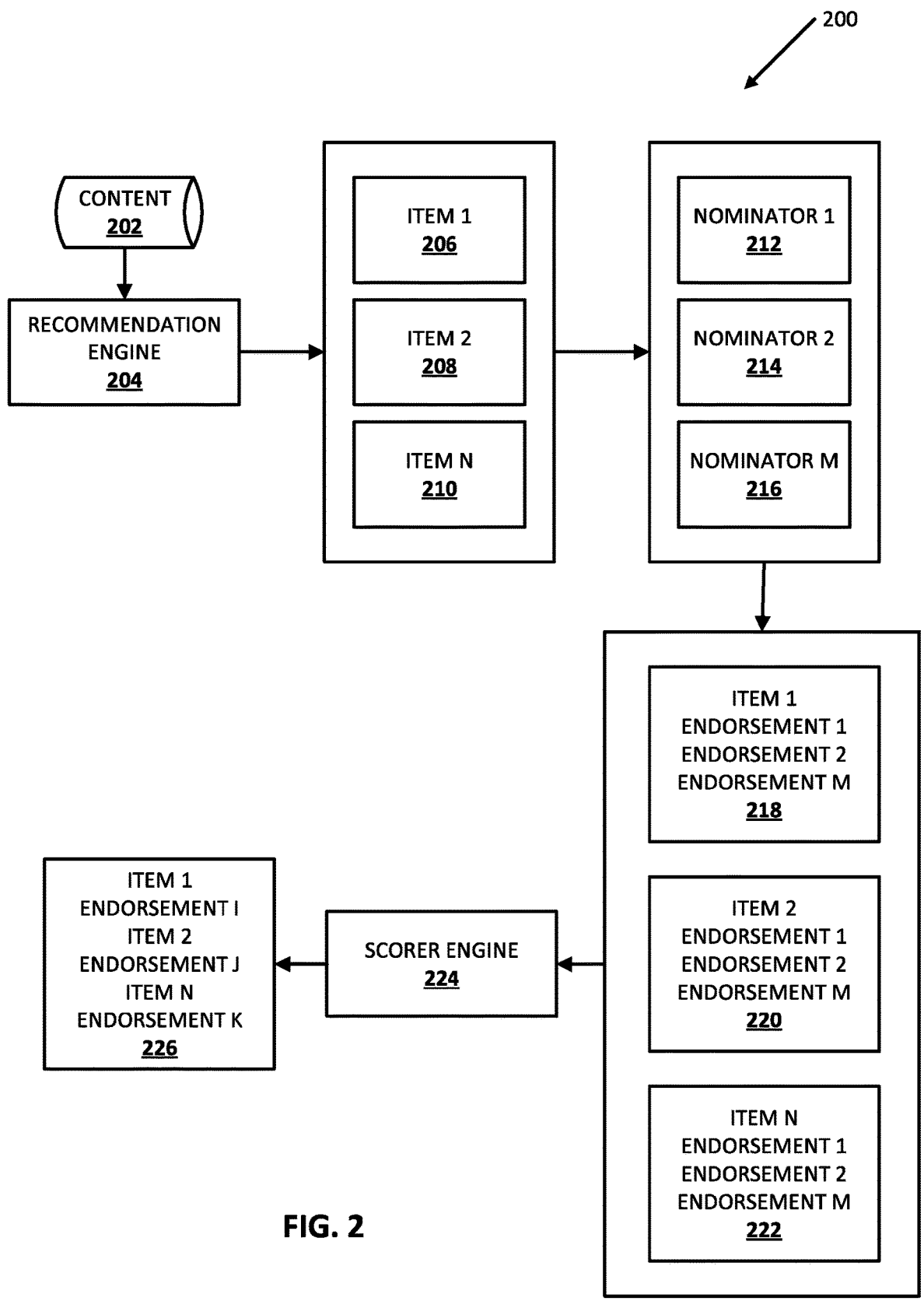
FIG. 2 illustrates an example of utilizing an ensemble of nominators to generate item endorsements in accordance with various implementations described herein.

FIG. 2 illustrates an example of utilizing an ensemble of nominators to generate item endorsements in accordance with various implementations described herein.

Recommendation engine 204 (which may correspond to and/or share characteristics with recommendation engine 106 in FIG. 1) selects one or more items of content 202 to recommend to a user. For example, recommendation engine 204 can select item 1 206, item 2 208, and item N 210. Additional and/or alternative items of content can be selected for recommendation to the user. In a variety of implementations, recommendation engine 204 selects items of content 206, 208, 210 in response to a request for content by the user. For example, a user can provide a spoken request of "show me devices that will work with my smart thermostat", and recommendation engine 204 can determine item 1—"smart smoke detector", item 2—"smart camera A", and item N—"smart camera B" as items of content responsive to the user's request. Additionally or alternatively, recommendation engine 204 can preemptively determine items of content to recommend to the user. For example, the system can determine a user is near the client device, and can preemptively determine recommended items of content 206, 208, 210.

Recommended items of content 206, 208, 210 can be processed using an ensemble of nominators such as nominator 1 212, nominator 2 214, and nominator M 216. In many implementations, each nominator 212, 214, 216 can determine a candidate endorsement corresponding to each recommended item of content. Item of content 1 and associated candidate endorsements 218 can include endorsement 1 (determined using nominator 1 212), endorsement 2 (determined using nominator 2 214), and endorsement M (determined using nominator M 216). Similarly, item of content 2 and associated candidate endorsements 220 can include endorsement 1 (determined using nominator 1 212), endorsement 2 (determined using nominator 2 214), and endorsement M (determined using nominator M 216). Additionally or alternatively, item of content N and associated candidate endorsements 222 can include endorsement 1 (determined using nominator 1 212), endorsement 2 (determined using nominator 2 214), and endorsement M (determined using nominator M 216).

Scorer engine 224 (which may correspond to or share characteristics with scorer engine 114 in FIG. 1) can determine a score for each candidate endorsement, as well as select a candidate endorsement to present with the item of content. For example, for item of content 1 and corresponding candidate endorsements 218, scorer engine 224 can determine a score for candidate endorsement 1, candidate endorsement 2, and candidate endorsement M. Similarly, scorer engine 224 can determine a score for each candidate endorsement of item 2 and corresponding candidate endorsements 220, as well as determine a score for each candidate endorsement of item N and corresponding candidate endorsements 222. In many implementations, a score can be based on a variety of sub-scores including a nominator sub-score, a strategy sub-score, and an entity personalization sub-score. Determining scores of candidate endorsements is described herein with respect to process 500 of FIG. 5.

In many implementations, recommended items of content and the selected endorsements 226 can include, for example, item 1, endorsement i; item 2, endorsement j; and item N, endorsement k. Recommended items of content and selected endorsements 226 can be rendered for the user via the client device.

Figure 3:
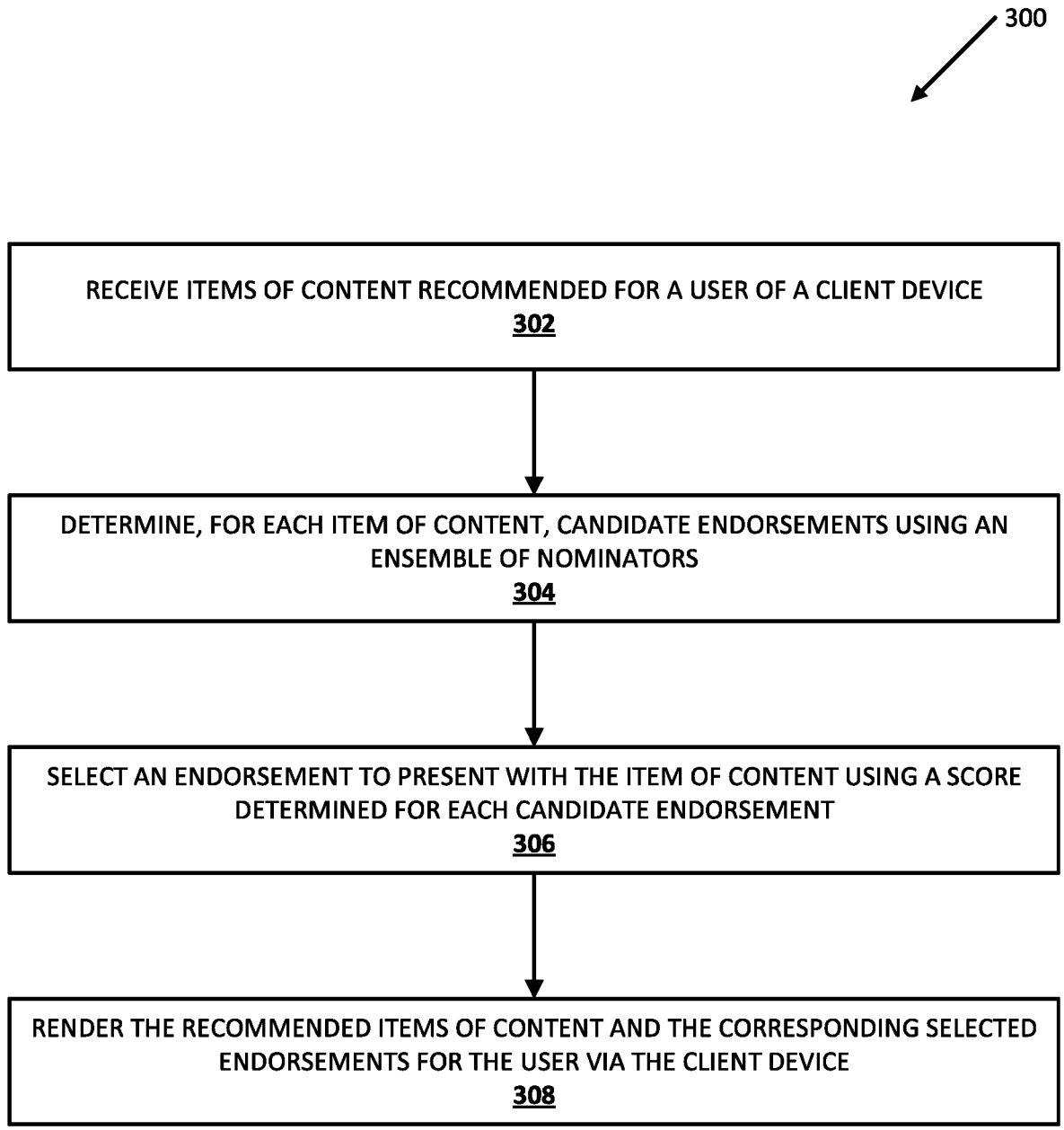
FIG. 3 is a flowchart illustrating an example process of determining endorsements to present with recommended items of content in accordance with various implementations disclosed herein.

FIG. 3 is a flowchart illustrating an example process 300 of rendering items of content and corresponding endorsements, where the endorsements are selected from a plurality of candidate endorsements determined using an ensemble of nominators according to implementations disclosed herein. For convenience, the operations of the flowchart are described with reference to a system that performs the operations. This system may include various components of various computer systems, such as one or more components of client device 102 of FIG. 1. Moreover, while operations of process 300 are shown in a particular order, this is not meant to be limiting. One or more operations may be reordered, omitted, and/or added.

At block 302, the system receives items of content recommended for a user of a client device. Recommended content items can be determined, for instance, using a recommendation engine such as recommendation engine 106 in FIG. 1 or recommendation engine 204 in FIG. 2. In many implementations, the recommendation engine is integrated locally with the system (e.g., the recommendation engine is local to a client device). Additionally or alternatively, the recommendation engine can be remote from the system (e.g., the recommendation engine is in the cloud and provides recommended content to a client device via the internet). For example, the system can receive recipes recommended for the user such as: "banana pancakes recipe", "French toast recipe" and "breakfast casserole recipe".

At block 304, the system determines, for each recommended item of content, candidate endorsements using an ensemble of nominators. Candidate endorsements for a recommended item of content can be determined using an ensemble of nominators, where each nominator is used in determining a corresponding candidate endorsement. Process 400 of FIG. 4 as described herein illustrates a process of determining candidate endorsements using an ensemble of nominators. For example, candidate endorsements of "this recipe was selected because you enjoy breakfast recipes", "this recipe is low in calories", "this recipe was invented by Hypothetical Famous Chef", and "80,000 people liked this recipe" can be generated for the recommended item of content "banana pancakes recipe".

At block 306, the system selects an endorsement to present with each item of content using a score determined for each candidate endorsement. In many implementations, the score for each candidate endorsement can be determined based on a nominator sub-score, a strategy sub-score, an entity personalization sub-score, and/or additional factors. Determining scores for candidate endorsements is described herein with respect to process 500 of FIG. 5. Furthermore, an endorsement can be selected from the candidate endorsements based on the score to present with the item of content to the user. For example, the candidate endorsement with the highest score can be selected to present with the item of content. For example, candidate endorsements for the recommended item of content "banana pancakes recipe" can be scored as: "this recipe was selected because you enjoy breakfast recipes"—score 10; "this recipe is low in calories"—score 35 "this recipe was invented by Hypothetical Famous Chef"—score 30; and "80,000 people liked this recipe"—score 21. In many implementations, the system can select the candidate endorsement with the highest score to present to the user with the item of content (e.g., "this recipe is low in calories" is selected because it has the highest score (35) of scores 10, 35, 30, and 21). Additionally or alternatively, the system can select the candidate endorsement with the lowest score to present with the item of content (e.g., "this recipe was selected because you enjoy breakfast recipes" is selected because it has the lowest score (10) out of scores 10, 35, 30, and 21).

In a variety of implementations, the system can select candidate endorsements with a score over a threshold value. For example, the system can select "this recipe is low in calories" and "this recipe was invented by Hypothetical Famous Chef" as having a score over a threshold value 25. As another example, the system can select "this recipe is low in calories", "this recipe was invented by Hypothetical Famous Chef", and "80,000 users liked this recipe" can be selected as endorsements as having a score over a threshold value of 21.

In many implementations, endorsements to present with items of content can be selected to increase diversity of the selected for endorsements. For example, the system can ensure a diversity of endorsement to prevent all endorsements from being similar (e.g., to prevent every endorsement presented with the recommended recipes from being "this recipe is low in calories"). In many implementations, determinantal point processes can be utilized for diversity of endorsements.

At block 308, the system renders the recommended items of content and the corresponding selected endorsements for the user via the client device. For example, the system can render the recommended items of content and the selected endorsements via a screen, a speaker, and/or additional user interface output device(s).

Figure 4:
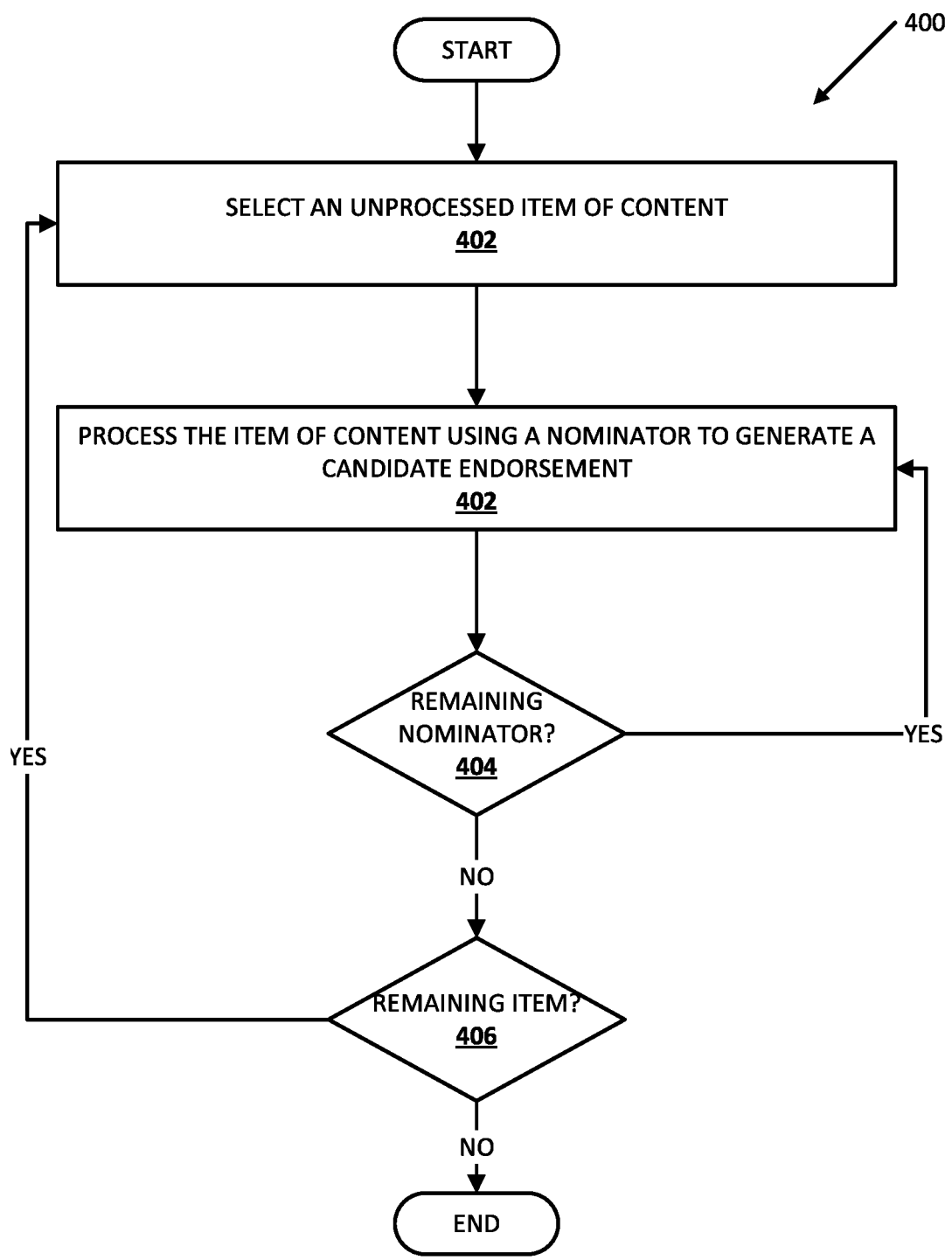
FIG. 4 is a flowchart illustrating an example process of generating candidate endorsements in accordance with various implementations described herein.

FIG. 4 is a flowchart illustrating an example process 400 of generating candidate endorsements according to implementations disclosed herein. For convenience, the operations of the flowchart are described with reference to a system that performs the operations. This system may include various components of various computer systems, such as one or more components of client device 102 of FIG. 1. Moreover, while operations of process 400 are shown in a particular order, this is not meant to be limiting. One or more operations may be reordered, omitted, and/or added.

At block 402, the system selects an unprocessed item of content. For example, an item of content without corresponding candidate endorsements can be selected.

At block 404, the system processes the item of content using a nominator to generate a candidate endorsement. For example, a nominator in the ensemble of nominators that has not yet been used in generating a candidate endorsement can be selected.

At block 404, the system determines whether any nominators in the ensemble of nominators is capable of generating further candidate endorsements for the item of content. If any nominators remain, the system proceeds back to block 402 and processes the item of content using an unused nominator to generate an additional candidate endorsement before proceeding to block 404 and determining if any nominators in the ensemble have not been utilized. If all nominators in the ensemble of nominators have been utilized in generating candidate endorsements, the system proceeds to block 406.

At block 406, the system determines whether any recommended items of content have not been processed using the ensemble of nominators to generate candidate endorsements. If candidate endorsements have not been determined for recommend item(s) of content, the system proceeds back to block 402 and an unprocessed item of content is selected before proceeding to blocks 402, 404, and 406. If candidate endorsements have been determined for all recommended items of content, the system ends.

Figure 5:
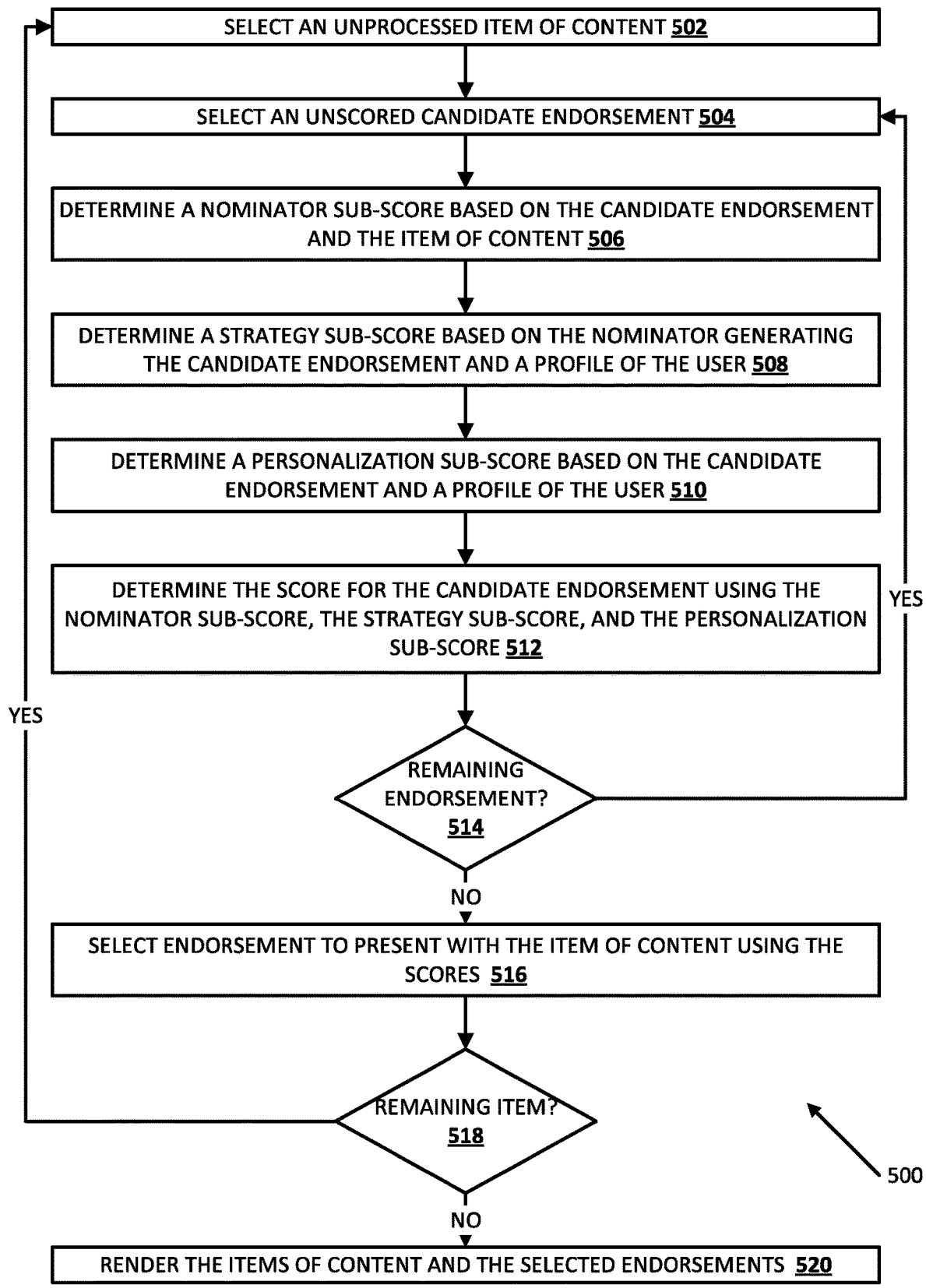
FIG. 5 is a flowchart illustrating an example process of scoring candidate endorsements and selecting an endorsement to present with an item of recommended content using the scores in accordance with various implementations disclosed herein.

FIG. 5 is a flowchart illustrating an example process 500 of determining scores for candidate endorsements and selecting an endorsement to present with items of content according to implementations disclosed herein. For convenience, the operations of the flowchart are described with reference to a system that performs the operations. This system may include various components of various computer systems, such as one or more components of client device 102 of FIG. 1. Moreover, while operations of process 500 are shown in a particular order, this is not meant to be limiting. One or more operations may be reordered, omitted, and/or added.

At block 502, the system selects an unprocessed recommended item of content. For example, the system can determine an item of content without a selected endorsement (i.e., the item of content has corresponding candidate endorsements, and an endorsement to present with the item of content has not been selected from the candidate endorsements).

At block 504, the system selects an unscored candidate endorsement corresponding with the item of content selected at block 502. As an illustrative example in accordance with many implementations disclosed herein, a user A can be recommended item of content B, where candidate endorsement C is determined for recommended item of content B using nominator D.

At block 506, the system determines a nominator sub-score based on the candidate endorsement and the selected item of content. For example, the nominator subs-core can be determined using the candidate endorsement C and the recommended item of content B.

At block 508, the system determines a strategy sub-score based on the nominator utilized in generating the candidate endorsement and a profile of the user. For example, the strategy sub-score can be determined using nominator D and one or more attributes of a user profile associated with user A.

At block 510, the system determines an entity personalization sub-score based on the candidate endorsement (i.e., the candidate endorsement selected at block 504) and the profile of the user. For example, the entity personalization sub-score can be determined using candidate endorsement C and one or more attributes of the user profile associated with user A.

At block 512, the system determines a score for the candidate endorsement using the nominator sub-score determined at block 506, the strategy sub-score determined at block 508, the entity personalization sub-score determined at block 510, and/or additional score components (e.g., additional sub-score(s), additional user information, etc.).

At block 514, the system determines whether any candidate endorsements corresponding with the item of content selected at block 502 have not been scored. If candidate endorsement(s) are unscored, the system proceeds back to block 504 to select an unscored candidate endorsement, before proceeding to blocks 506, 508, 510, and 512. If all candidate endorsements corresponding with the selected item of content have been scored, the system proceeds to block 516.

At block 516, the system selects an endorsement to present with the item of content using the scores of the candidate endorsements corresponding with that item of content. For example, the system can select the candidate endorsement with the highest score.

At block 518, the system determines whether any recommended items of content with corresponding candidate endorsements have not been processed. If so, the system proceeds back to block 502 and selects an unprocessed item of content with corresponding candidate endorsements before proceeding to blocks 504, 506, 508, 510, 512, and 514. If the system has selected an endorsement to present with every recommended item of content, the system proceeds to block 520.

Figure 6:
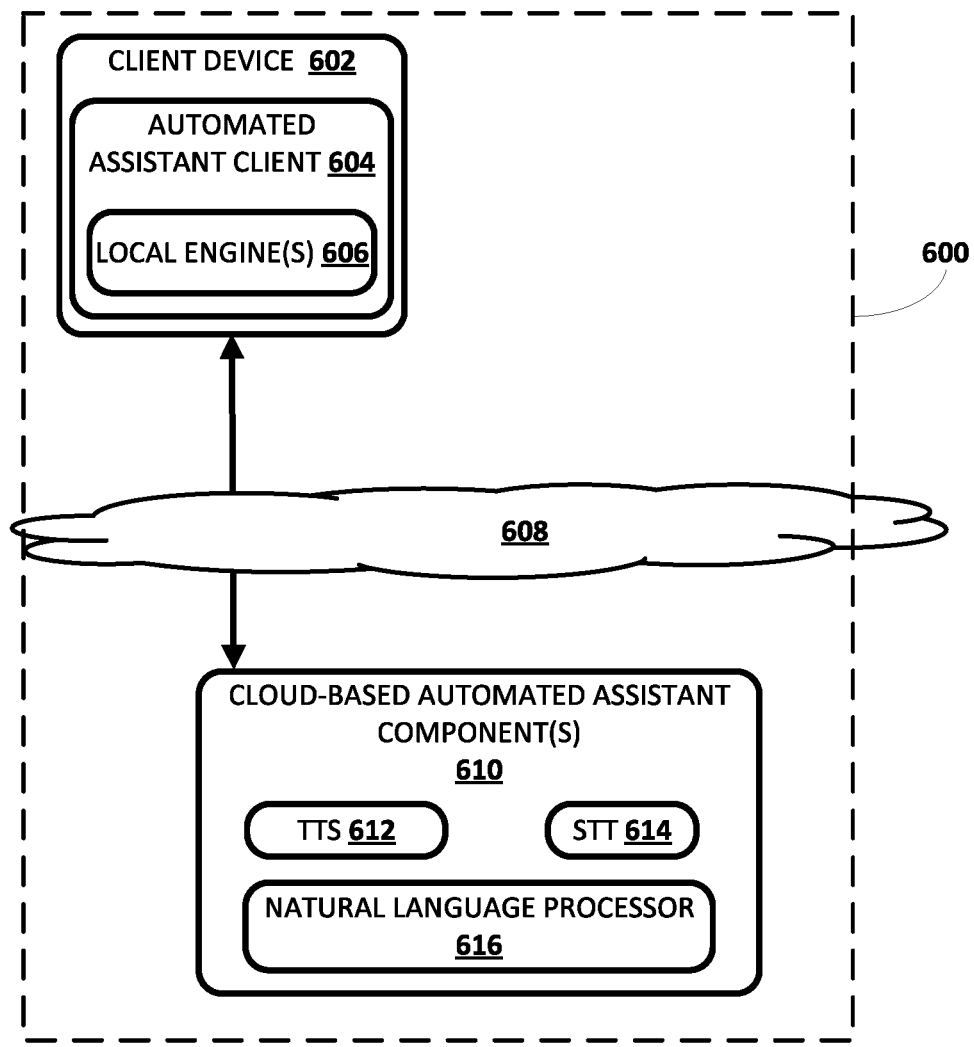
FIG. 6 illustrates another example environment in which implementations disclosed herein can be implemented.

At block 520, the system renders the items of content and the selected endorsements for the user. Optionally, the system can change the order one or more items of content are rendered for the user based on the endorsement scores of the selected endorsements. For example, recommended items of content can include item A, item B, and item C, where item A should be rendered first, item B should be rendered second, and item C should be rendered third. Item A can have a selected endorsement with a score of 5, item B can have a selected endorsement with a score of 10, and item C can have a selected endorsement with a score of 7. In many implementations, the items of content can be rendered in a new order, where item B is rendered first, item C is rendered second, and item A is rendered third, based on the scores of the selected endorsements Turning to FIG. 6, an example environment in which implementations disclosed herein can be implemented. FIG.

6 includes a client computing device 602, which execute an instance of an automated assistant client 604. One or more cloud-based automated assistant components 610 can be implemented on one or more computing systems (collectively referred to as a "cloud" computing system) that are communicatively coupled to client device 602 via one or more local and/or wide area networks (e.g., the Internet) indicated generally at 608.

An instance of an automated assistant client 604, by way of its interactions with one or more cloud-based automated assistant components 610, may form what appears to be, from the user's perspective, a logical instance of an automated assistant 600 with which the user may engage in a human-to-computer dialog. It thus should be understood that in some implementations, a user that engages with an automated assistant client 604 executing on client device 602 may, in effect, engage with his or her own logical instance of an automated assistant 600. For the sakes of brevity and simplicity, the term "automated assistant" as used herein as "serving" a particular user will often refer to the combination of an automated assistant client 604 executing on a client device 602 operated by the user and one or more cloud-based automated assistant components 610 (which may be shared amongst multiple automated assistant clients of multiple client computing devices). It should also be understood that in some implementations, automated assistant 600 may respond to a request from any user regardless of whether the user is actually "served" by that particular instance of automated assistant 600.

The client computing device 602 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 602 may be distributed between multiple computing devices. For example, one or more operations of client computing device 602 may be distributed between a mobile smartphone and a vehicle computing device. Furthermore, operations of client computing device 602 may be repeated between multiple computing devices (which in some cases may be communicatively coupled). As a further example, a mobile smartphone as well as a vehicle interface device may each implement operations of automated assistant 600, such as a mobile smartphone and a vehicle interface device both including an invocation engine (described below). In various implementations, the client computing device 602 may optionally operate one or more other applications that are in additional to automated assistant client 604, such as a message exchange client (e.g., SMS, MMS, online chat), a browser, and so forth. In some of those various implementations, one or more of the other applications can optionally interface (e.g. via an application programming interface) with the automated assistant 604, or include their own instance of an automated assistant application (that may also interface with the cloud-based automated assistant component(s) 610).

Automated assistant 600 engages in human-to-computer dialog sessions with a user via user interface input and output devices of the client device (not pictured). To preserve user privacy and/or to conserve resources, in many situations a user must often explicitly invoke the automated assistant 600 before the automated assistant will fully process a spoken utterance. The explicit invocation of the automated assistant 600 can occur in response to certain user interface input received at the client device 602. For example, user interface inputs that can invoke the automated assistant 600 via the client device 602 can optionally include actuations of a hardware and/or virtual button of the client device 602. Moreover, the automated assistant client can include one or more local engines 606, such as an invocation engine that is operable to detect the presence of one or more spoken invocation phrases. The invocation engine can invoke the automated assistant 600 in response to detection of one or more of the spoken invocation phrases. For example, the invocation engine can invoke the automated assistant 600 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 600. As used herein, "invoking" the automated assistant 600 can include causing one or more previously inactive functions of the automated assistant 600 to be activated. For example, invoking the automated assistant 600 can include causing one or more local engines 606 and/or cloud-based automated assistant components 610 to further process audio data frames based on which the invocation phrase was detected, and/or one or more following audio data frames (whereas prior to invoking no further processing of audio data frames was occurring).

The one or more local engine(s) 606 of automated assistant 604 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 602 is relatively constrained in terms of computing resources (e.g., processor cycles, memory, battery, etc.), the local engines 606 may have limited functionality relative to any counterparts that are included in cloud-based automated assistant components 610.

Automated assistant client 604 can additionally include a content agent engine (not pictured) which can be utilized by automated assistant client 604 in accordance with a variety of implementations including: generating a content agent, determining content related to a user request using a content agent, determining content using a content agent without receiving a user request, etc.

Cloud-based automated assistant components 610 leverage the virtually limitless resources of the cloud to perform more robust and/or more accurate processing of audio data, and/or other user interface input, relative to any counterparts of the local engine(s) 606. Again, in various implementations, the client device 602 can provide audio data and/or other data to the cloud-based automated assistant components 610 in response to the invocation engine detecting a spoken invocation phrase, or detecting some other explicit invocation of the automated assistant 600.

The illustrated cloud-based automated assistant components 610 include a cloud-based TTS module 612, a cloud-based STT module 614, and a natural language processor 616. In some implementations, one or more of the engines and/or modules of automated assistant 600 may be omitted, combined, and/or implemented in a component that is separate from automated assistant 600. Further, in some implementations automated assistant 600 can include additional and/or alternative engines and/or modules.

Cloud-based STT module 614 can convert audio data into text, which may then be provided to natural language processor 616. In various implementations, the cloud-based STT module 614 can covert audio data into text based at least in part on indications of speaker labels and assignments that are provided by an assignment engine (not illustrated).

Cloud-based TTS module 612 can convert textual data (e.g., natural language responses formulated by automated assistant 600) into computer-generated speech output. In some implementations, TTS module 612 may provide the computer-generated speech output to client device 602 to be output directly, e.g., using one or more speakers. In other implementations, textual data (e.g., natural language responses) generated by automated assistant 600 may be provided to one of the local engine(s) 606, which may then convert the textual data into computer-generated speech that is output locally.

Natural language processor 616 of automated assistant 600 processes free form natural language input and generates, based on the natural language input, annotated output for use by one or more other components of the automated assistant 600. For example, the natural language processor 616 can process natural language free-form input that is textual input that is a conversion, by STT module 614, of audio data provided by a user via client device 602. The generated annotated output may include one or more annotations of the natural language input and optionally one or more (e.g., all) of the terms of the natural language input. In some implementations, the natural language processor 616 is configured to identify and annotate various types of grammatical information in natural language input. For example, the natural language processor 616 may include a part of speech tagger (not depicted) configured to annotate terms with their grammatical roles. Also, for example, in some implementations the natural language processor 616 may additionally and/or alternatively include a dependency parser (not depicted) configured to determine syntactic relationships between terms in natural language input.

In some implementations, the natural language processor 616 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 616 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 616 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 616 may rely on annotations from one or more other components of the natural language processor 616. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 616 may use related prior input and/or other related data outside of the particular natural language input to determine one or more annotations.

Figure 7:
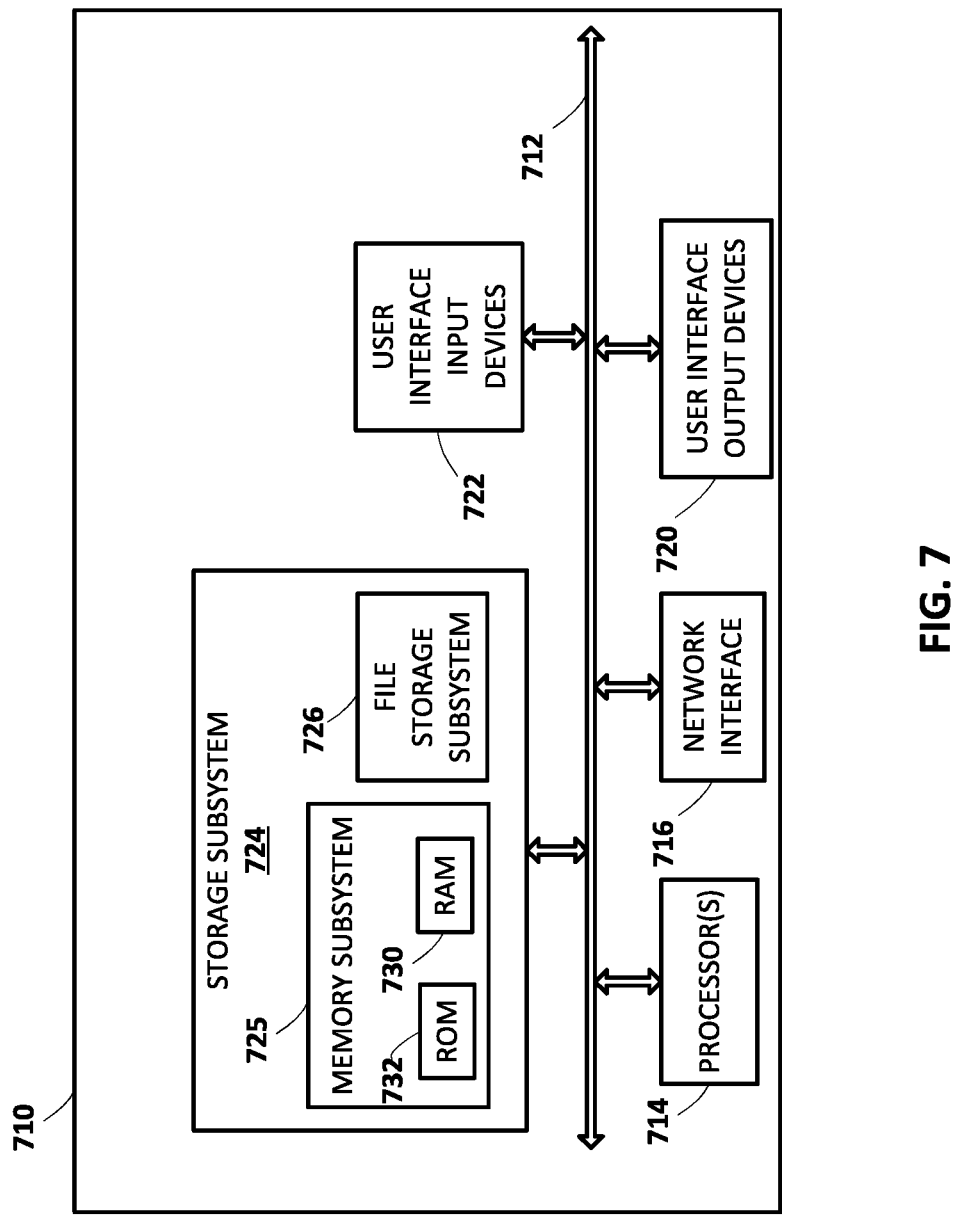
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 3, FIG. 4, and/or FIG. 5, as well as to implement various components depicted in FIG. 1.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes receiving a plurality of items of content to be recommended for a user of a client device. For each item of content to be recommended for the user, the method further includes determining a plurality of candidate endorsements corresponding to the item of content by processing the item of content using a plurality of nominators, each nominator generating one of the candidate endorsements, where each candidate endorsement is a natural language explanation of why the user should interact with the item of content. The method further includes determining a score for each candidate endorsement by processing the plurality of candidate endorsements corresponding to the item of content using a ranking agent, where the score is indicative of a likelihood the user will interact with the item of content based on the candidate endorsement, and where the ranking agent determines the score uniformly across the plurality of nominators. The method further includes selecting an endorsement from the plurality of candidate endorsements to present with the item of content based on the score of each candidate endorsement corresponding to the item of content. The method further includes rendering the plurality of items of content and the selected endorsements corresponding to the plurality of items for the user via one or more user interface output devices of the client device.

These and other implementations of the technology disclosed herein can include one or more of the following features.

In some implementations, the plurality of nominators includes a variety of types of nominators, and wherein each type of nominator generates candidate endorsements based on a distinct corpus of information related to the item of content. In some implementations, the variety of types of nominators is selected from recommender nominators, summarization nominators, fact nominators, and baseline nominators. In some implementations, the plurality of nominators includes a plurality of the same type of nominators.

In some implementations, the natural language explanation of why the user should interact with the item of content includes a dialog with the user via the client device.

In some implementations, the natural language explanation of why the user should interact with the item of content includes a phrase rendered for the user via the client device.

In some implementations, determining the score for each candidate endorsement by processing the plurality of candidate endorsements corresponding to the item of content using the ranking agent further includes determining a nominator sub-score based the candidate endorsement and the item of content. In some implementations, the method further includes determining a strategy sub-score based on the nominator corresponding to the candidate endorsement and a user profile associated with the user. In some implementations, the method further includes determining an entity personalization sub-score based on the candidate endorsement and the user profile associated with the user. In some implementations, the method further includes determining the score based on the nominator sub-score, the strategy sub-score, and the entity personalization sub-score.

In some implementations, selecting the endorsement from the plurality of candidate endorsements to present with the item of content based on the score of each candidate endorsement corresponding to the item of content includes selecting the endorsement with the highest score value in the plurality of candidate endorsements.

In some implementations, selecting the endorsement from the plurality of candidate endorsements to present with the item of content based on the score of each candidate endorsement corresponding to the item of content further includes: selecting a plurality of endorsements corresponding to each item of content, wherein each selected endorsement in the plurality of endorsements has a score exceeding a threshold value.

In some implementations, the method further includes each nominator generating a plurality of candidate endorsements for each item of content.

In some implementations, selecting the endorsement from the plurality of candidate endorsements to present with the item of content further includes: utilizing a mechanism to ensure diversity in the selected endorsements corresponding with each item of content in the plurality of items of content. In some implementations, the mechanism to ensure diversity in the selected endorsements is a determinantal point process.

In some implementations, the method further includes determining whether the user interacts with a specific item of content determined using a specific nominator subsequent to rendering the plurality of items of content and the selected endorsements corresponding to the plurality of items. In some implementations, the method further includes updating the specific nominator based on the user interaction with the specific item of content. In some implementations, the method further includes updating each nominator in the plurality of nominators excluding the specific nominator based on the user interaction with the specific item of content.

In some implementations, the plurality of items of content recommended the user are determined using a recommendation agent of automated assistant client of the client device. In some implementations, the plurality of items of content recommended by the recommendation agent includes an initial order to render the plurality of items of content for the user, and the method further includes reordering the items of content and the selected endorsements based on the determined score prior to rendering the plurality of items of content and the selected endorsements for the user.

In some implementations, a method implemented by one or more processors is provided that includes receiving a plurality of items of content to be presented to a user of a client device. For each item of content to be recommended for the user, the method further includes determining a plurality of candidate endorsements corresponding to the item of content by processing the item of content using a plurality of nominators, each nominator generating one of the candidate endorsements, where each candidate endorsement provides a natural language description of information relating to the item of content. The method further includes determining a score for each candidate endorsement by processing the plurality of candidate endorsements corresponding to the item of content using a ranking agent, where the score is indicative of a likelihood the user will interact with the item of content based on the candidate endorsement, and where the ranking agent determines the score uniformly across the plurality of nominators. The method further includes selecting an endorsement from the plurality of candidate endorsements to present with the item of content based on the score of each candidate endorsement corresponding to the item of content. The method further includes rendering the plurality of items of content and the selected endorsements corresponding to the plurality of items for the user via one or more user interface output devices of the client device.

These and other implementations of the technology disclosed herein can include one or more of the following features.

In some implementations, the plurality of nominators includes a variety of types of nominators, and wherein each type of nominator generates candidate endorsements based on a distinct corpus of information related to the item of content. In some implementations, the variety of types of nominators is selected from recommender nominators, summarization nominators, fact nominators, and baseline nominators. In some implementations, the plurality of nominators includes a plurality of the same type of nominators.

In some implementations, the endorsement includes a dialog with the user via the client device.

In some implementations, the endorsement includes a phrase rendered for the user via the client device.

In some implementations, determining the score for each candidate endorsement by processing the plurality of candidate endorsements corresponding to the item of content using the ranking agent includes determining a nominator sub-score based the candidate endorsement and the item of content. In some implementations, the method further includes determining a strategy sub-score based on the nominator corresponding to the candidate endorsement and a user profile associated with the user. In some implementations, the method further includes determining an entity personalization sub-score based on the candidate endorsement and the user profile associated with the user. In some implementations, the method further includes determining the score based on the nominator sub-score, the strategy sub-score, and the entity personalization sub-score.

In some implementations, selecting the endorsement from the plurality of candidate endorsements to present with the item of content based on the score of each candidate endorsement corresponding to the item of content includes selecting the endorsement with the highest score value in the plurality of candidate endorsements.

In some implementations, selecting the endorsement from the plurality of candidate endorsements to present with the item of content based on the score of each candidate endorsement corresponding to the item of content further includes: selecting a plurality of endorsements corresponding to each item of content, wherein each selected endorsement in the plurality of endorsements has a score exceeding a threshold value.

In some implementations, the method further includes each nominator generating a plurality of candidate endorsements for each item of content.

In some implementations, selecting the endorsement from the plurality of candidate endorsements to present with the item of content further includes utilizing a mechanism to ensure diversity in the selected endorsements corresponding with each item of content in the plurality of items of content. In some implementations, the mechanism to ensure diversity in the selected endorsements is a determinantal point process.

In some implementations, the method further includes determining whether the user interacts with a specific item of content determined using a specific nominator subsequent to rendering the plurality of items of content and the selected endorsements corresponding to the plurality of items. In some implementations, the method further includes updating the specific nominator based on the user interaction with the specific item of content. In some implementations, the method further includes updating each nominator in the plurality of nominators excluding the specific nominator based on the user interaction with the specific item of content.

In some implementations, the plurality of items of content to be presented to the user are determined using a recommendation agent of automated assistant client of the client device. In some implementations, the plurality of items of content determined by the recommendation agent includes an initial order to render the plurality of items of content for the user, and further including: reordering the items of content and the selected endorsements based on the determined score prior to rendering the plurality of items of content and the selected endorsements for the user.

What is claimed is:

1. A method implemented by one or more processors, the method comprising:
   receiving a plurality of items of media content to be presented to a user of a client device;
   for each item of content to be recommended for the user:
      determining a plurality of candidate endorsements corresponding to the item of content by processing the item of content using a plurality of nominators including a variety of types of nominators, each nominator generating one of the candidate endorsements, wherein each type of nominator generates candidate endorsements based on a distinct corpus of information related to the item of content, and wherein each candidate endorsement provides a natural language description of information relating to the item of content;
      determining a score for each candidate endorsement by processing the plurality of candidate endorsements corresponding to the item of content using a ranking agent, wherein the score is indicative of a likelihood the user will interact with the item of content based on the candidate endorsement, and wherein the ranking agent determines the score uniformly across the plurality of nominators;
      selecting an endorsement from the plurality of candidate endorsements to present with the item of content based on the score of each candidate endorsement corresponding to the item of content; and
   rendering the plurality of items of content and the selected endorsements corresponding to the plurality of items for the user via one or more user interface output devices of the client device.

2. The method of claim 1, wherein the variety of types of nominators is selected from recommender nominators, summarization nominators, fact nominators, and baseline nominators.

3. The method of claim 1, wherein the plurality of nominators includes a plurality of the same type of nominators.

4. The method of claim 1, wherein the endorsement includes a dialog with the user via the client device.

5. The method of claim 1, wherein the endorsement includes a phrase rendered for the user via the client device.

6. The method of claim 1, wherein determining the score for each candidate endorsement by processing the plurality of candidate endorsements corresponding to the item of content using the ranking agent comprises:
   determining a nominator sub-score based on the candidate endorsement and the item of content;
   determining a strategy sub-score based on the nominator corresponding to the candidate endorsement and a user profile associated with the user;
   determining an entity personalization sub-score based on the candidate endorsement and the user profile associated with the user; and
   determining the score based on the nominator sub-score, the strategy sub-score, and the entity personalization sub-score.

7. The method of claim 1, wherein selecting the endorsement from the plurality of candidate endorsements to present with the item of content based on the score of each candidate endorsement corresponding to the item of content comprises:
   selecting the endorsement with the highest score value in the plurality of candidate endorsements.

8. The method of claim 1, wherein selecting the endorsement from the plurality of candidate endorsements to present with the item of content based on the score of each candidate endorsement corresponding to the item of content further comprises:
   selecting a plurality of endorsements corresponding to each item of content, wherein each selected endorsement in the plurality of endorsements has a score exceeding a threshold value.

9. The method of claim 1, further comprising each nominator generating a plurality of candidate endorsements for each item of content.

10. The method of claim 1, wherein selecting the endorsement from the plurality of candidate endorsements to present with the item of content further comprises:
    utilizing a mechanism to ensure diversity in the selected endorsements corresponding with each item of content in the plurality of items of content.

11. The method of claim 10, wherein the mechanism to ensure diversity in the selected endorsements is a determinantal point process.

12. The method of claim 1, further comprising:
    determining whether the user interacts with a specific item of content determined using a specific nominator subsequent to rendering the plurality of items of content and the selected endorsements corresponding to the plurality of items; and
    updating the specific nominator based on the user interaction with the specific item of content.

13. The method of claim 12, further comprising:
    updating each nominator in the plurality of nominators excluding the specific nominator based on the user interaction with the specific item of content.

14. The method of claim 1, wherein the plurality of items of content to be presented to the user are determined using a recommendation agent of automated assistant client of the client device.

15. The method of claim 14, wherein the plurality of items of content determined by the recommendation agent includes an initial order to render the plurality of items of content for the user, and the method further comprising:
    reordering the items of content and the selected endorsements based on the determined score prior to rendering the plurality of items of content and the selected endorsements for the user.

16. At least one non-transitory computer-readable medium comprising instructions that when executed by one or more processors of a computing system, cause the computing system to perform the following operations:
    receiving a plurality of items of media content to be presented to a user of a client device;
    for each item of content to be recommended for the user:
       determining a plurality of candidate endorsements corresponding to the item of content by processing the item of content using a plurality of nominators including a variety of types of nominators, each nominator generating one of the candidate endorsements, wherein each type of nominator generates candidate endorsements based on a distinct corpus of information related to the item of content, and wherein each candidate endorsement is a natural language description of information relating to the item of content;

determining a score for each candidate endorsement by processing the plurality of candidate endorsements corresponding to the item of content using a ranking agent, wherein the score is indicative of a likelihood the user will interact with the item of content based on the candidate endorsement, and wherein the ranking agent determines the score uniformly across the plurality of nominators;

selecting an endorsement from the plurality of candidate endorsements to present with the item of content based on the score of each candidate endorsement corresponding to the item of content; and rendering the plurality of items of content and the selected endorsements corresponding to the plurality of items for the user via one or more user interface output devices of the client device.

17. The at least one non-transitory computer-readable medium of claim 16, wherein the variety of types of nominators is selected from recommender nominators, summarization nominators, fact nominators, and baseline nominators.

18. A system comprising one or more processors and memory storing instructions that, in response to execution of the instructions by the one or more processors, cause the one or more processors to:

receive a plurality of items of media content to be presented to a user of a client device;

for each item of content to be recommended for the user:
determine a plurality of candidate endorsements corresponding to the item of content by processing the item of content using a plurality of nominators including a variety of types of nominators, each nominator generating one of the candidate endorsements, wherein each type of nominator generates candidate endorsements based on a distinct corpus of information related to the item of content, and wherein each candidate endorsement is a natural language description of information relating to the item of content;

determine a score for each candidate endorsement by processing the plurality of candidate endorsements corresponding to the item of content using a ranking agent, wherein the score is indicative of a likelihood the user will interact with the item of content based on the candidate endorsement, and wherein the ranking agent determines the score uniformly across the plurality of nominators;

select an endorsement from the plurality of candidate endorsements to present with the item of content based on the score of each candidate endorsement corresponding to the item of content; and render the plurality of items of content and the selected endorsements corresponding to the plurality of items for the user via one or more user interface output devices of the client device.

* * * * *